United States Patent
Xu

(10) Patent No.: US 6,772,605 B2
(45) Date of Patent: Aug. 10, 2004

(54) LIQUID AIR CONDITIONER OF GROUND ENERGY TYPE

(76) Inventor: Shengheng Xu, Beijing Splendid General Mechanical New Technology Corporation No. 1 Building, Chedaogou, Zizhuyuan Road, Haidian District, Beijing 100089 (CN)

( * ) Notice: Subject to any disclaimer, the term of this patent is extended or adjusted under 35 U.S.C. 154(b) by 0 days.

(21) Appl. No.: 10/333,528

(22) PCT Filed: Jan. 18, 2001

(86) PCT No.: PCT/CN01/00062

§ 371 (c)(1),
(2), (4) Date: Jan. 21, 2003

(87) PCT Pub. No.: WO02/14750

PCT Pub. Date: Feb. 21, 2002

(65) Prior Publication Data

US 2004/0000159 A1 Jan. 1, 2004

(30) Foreign Application Priority Data

Aug. 18, 2000 (CN) .................................. 00123495 A

(51) Int. Cl.⁷ .............................................. F25D 23/12
(52) U.S. Cl. .......................... 62/260; 62/265.1; 165/45; 165/48.2
(58) Field of Search ............................... 62/260, 235.1, 62/236; 165/45, 48.2

(56) References Cited

U.S. PATENT DOCUMENTS 3,967,450 A * 7/1976 Girardier ..................... 60/657
4,158,291 A * 6/1979 Jones ........................ 60/641.1
4,355,683 A * 10/1982 Griffiths ....................... 165/60
4,394,814 A * 7/1983 Wardman et al. ......... 60/641.15
4,776,171 A * 10/1988 Perry et al. .................. 60/698
5,685,147 A * 11/1997 Brassea ....................... 60/496
5,899,066 A * 5/1999 Brassea-Flores ............. 60/496
5,937,665 A * 8/1999 Kiessel et al. ................ 62/260

FOREIGN PATENT DOCUMENTS

| CN | 1239770 A | 12/1999 |
| DE | 2938891 a | * 4/1981 |
| JP | 59-217451 | 12/1984 |
| JP | 60-164178 | 8/1985 |
| JP | 60-221658 | 11/1985 |

* cited by examiner

Primary Examiner—William E. Tapolcai
Assistant Examiner—Mohammad M. Ali
(74) Attorney, Agent, or Firm—Greer, Burns & Crain, LTD

(57) ABSTRACT

A liquid air conditioner of the geothermal energy type, includes a heat collector of the geothermal energy type, a heat exchanger, an energy lift device, a discharging pump, a returning pump, an air conditioner; said energy lift device consisting of a heating cycle and a heat exchanging cycle, said two cycles are sequentially connected through pipelines by a compressor, a condenser, a liquid reservoir, a drying filter, a restriction choke, an evaporator and a gas-liquid separator. A discharging tube of the heat exchanging cycle connects with the air conditioner. A returning tube of the air conditioner is connected to a liquid inlet tube of the heat exchanging cycle; a discharging tube of the heat exchanging cycle is connected to a returning tube; and a discharging tube of said heat exchanger is connected to a liquid inlet tube.

13 Claims, 3 Drawing Sheets

LIQUID AIR CONDITIONER OF GROUND ENERGY TYPE

FIELD OF THE INVENTION

The present invention relates to a heat exchanging system of the fixed pipelike passage members used for two heat exchanging media.

BACKGROUND OF THE INVENTION

Up to date, coal, gas or oil is mainly employed as energy sources in common heat supply system. It is known that not only do coal, gas and oil have limited reserves, but produce massive ash, dust or exhaust gas while/after their combustion, not only polluting the environment, but transforming the atmosphere properties, thus resulting in greenhouse effect which warms the earth and then melts glaciers and rises the ocean level and etc. Energy used in conventional refrigerating systems is electricity, which costs higher, and an amount of it are also generated from burning fuels like coal, gas or oil etc, therefore the same problems caused by combusting those fuels to the environment happen here again. Although a great deal of low level cold and heat sources are stored under the ground, in rivers, lakes, or oceans, they are unable to be directly used in heating or cooling.

SUMMARY OF THE INVENTION

An object of the present invention is to provide a liquid air conditioner of geothermal energy type utilizing geothermal heat as energy source without pollution.

The liquid air conditioner of geothermal energy type of the present invention comprises an underground heat collector of geothermal energy type, a heat exchanger, an energy lift device, a discharging pump, a returning pump, and an air conditioner. A discharging pump of the heat collector is equipped on a discharging tube of said collector of geothermal energy type. Said discharging tube of the heat collector is connected to the inlet side of the heat exchanger. Said energy lift device comprises a heating cycle and a heat exchanging cycle, said two cycles are sequentially connected through pipelines by a compressor, a condenser, a liquid reservoir, a drying filter, a restriction choke, an evaporator, and a gas-liquid separator. Said discharging tube of the heat exchanging cycle coupling with said condenser is connected to the air conditioner via the liquid inlet tube of the air conditioner and the discharging pump. The returning tube of said air conditioner is connected to the liquid inlet tube of heat exchanging cycle coupling with said condenser. The discharging tube of heat exchanging cycle coupling with said evaporator is connected to the returning tube on the outlet side of said heat exchanger via the returning pump. And the discharging tube on the outlet side of said heat exchanger is connected to the liquid inlet tube of heat exchanging cycle coupling with said evaporator.

The liquid air conditioner of geothermal energy type of the present invention further comprises two two-position-four-way valves. The discharging tube of the heat exchanging cycle coupling with said condenser in the heat exchanging cycle is connected to the first joint of the first two-position-four-way valve, and the liquid inlet tube of heat exchanging cycle coupling with said condenser is connected to the first joint of the second two-position four-way valve. The liquid inlet tube of air conditioner is connected to the second joint of the first two-position-four-way valve, and the returning tube of air conditioner is connected to the fourth joint of the second two-position-four-way valve. The discharging tube of heat exchanging cycle coupling with said evaporator is connected to the third joint of said first two-position-four-way valve, and the liquid inlet tube of heat exchanging cycle coupling with said evaporator is connected to the third joint of the second two-position-four-way valve. The outlet side liquid inlet tube of said heat exchanger is connected to the fourth joint of the first two-position-four-way valve, and the discharging tube of said heat exchanger is connected to the second joint of the second two-position-four-way valve.

The liquid air conditioner of geothermal energy type of the present invention further comprises a solar energy collector. Said solar energy collector consists of a circulation loop comprising a solar water heater, a solar energy reservoir, a water circulation pump sequentially connected through pipelines. The inlet and outlet stop valves are provided on the inlet and outlet pipelines of said solar energy reservoir. A heat exchanger is equipped in said reservoir. The inlet and outlet pipelines of said heat exchanger are connected in parallel to the discharging tube on the outlet side of said heat exchanger, and an inlet stop valve of heat exchanger is equipped on said inlet pipeline.

The liquid air conditioner of geothermal energy type of the present invention, wherein a running water inlet tube and a domestic hot-water discharging tube are connected on said solar water heater, and the stop valve of running water tube and the stop valve of domestic hot-water discharging tube are mounted on said running water inlet tube and said domestic hot-water discharging tube respectively.

The liquid air conditioner of geothermal energy type of the present invention further comprises an electric water heater. A transducer is provided in said electric water heater. The inlet and outlet pipelines of the transducer are in parallel connected to the discharging tube of the outlet side of said heat exchanger, and the inlet stop valve of the transducer is provided on the inlet pipeline of said transducer.

The liquid air conditioner of geothermal energy type of the present invention, wherein a waste-heat heater is provided in said electric water heater. The inlet and outlet pipelines of the waste-heat water heater are in parallel connected to the liquid inlet tube of heat exchanging cycle coupling with said evaporator. A stop valve of waste-heat heater is provided on the inlet or outlet pipeline of said waste-heat heater.

The liquid air conditioner of geothermal energy type of the present invention, wherein said collector of geothermal energy type is a storage box, said storage box comprises a storage container, storage cylinders filled with phase transition materials set in stagger by several layers in the storage container, an upper flow equalizer having evenly distributed throughholes which is placed on the top layer storage cylinder and a back plate having evenly distributed throughholes which is placed beneath the bottom layer storage cylinder. A liquid inlet is provided between the upper flow equalizer and the top wall of storage container. A liquid outlet is provided between the back plate and the bottom wall of storage container. Both ends of each storage cylinder have convex shoulders forming the gaps for fluid flow between the storage cylinders. And several fins are equipped on the outer wall of said container.

The liquid air conditioner of geothermal energy type of the present invention, wherein said fins are in star-shaped "*" disposition.

The liquid air conditioner of geothermal energy type of the present invention, wherein said heat collector of geothermal energy type is a heat collector tube system composed of several heat collector tube units in serial connection, in which every said heat collector tube unit consists of several heat collector tubes connected in series. Each heat collector tube consists of, coaxially assembled, a outer heat exchanging cylinder, a storage cylinder locating in said outer heat exchanging cylinder, a discharging tube locating in said storage cylinder and a liquid inlet tube connected to the top of said outer heat exchanging cylinder.

The liquid air conditioner of geothermal energy type of the present invention, wherein, said heat collector tube system consists of three stages of heat collector tube units, in which the length of outer heat exchanging cylinder of the first heat collector tube unit is 6 m, and the length of outer beat exchanging cylinder of the second heat collector tube unit is 4 m, and the length of outer heat exchanging cylinder of the third heat collector tube unit is 2 m.

The liquid air conditioner of geothermal energy type of the present invention, wherein the outer diameter of said outer heat exchanging cylinder is 100 mm, and the outer diameter of the storage cylinder is 80 mm, and outer diameter of the discharging tube is 25 mm.

The liquid air conditioner of geothermal energy type of the present invention, an antifreeze solution is filled in said heat exchanging cycle.

In view of the feature that the temperature varies little under the ground during a year, the liquid air conditioner of geothermal energy type of the present invention collects and stores the massive low level cold and heat sources contained underground, and via liquid, transmit the low level cold and heat energy of heat collector of geothermal energy type to the energy lift device, then via liquid again, transmit the lifted high level cold, heat energy to the place where needs of cold and heat (i.e. the load). In winter, the apparatus collects low-level subterranean heat (including sensible heat and latent heat generated during phase transition), whereas in summer, the apparatus returns the heat energy back underground. Thus it is an effective circulation device taking and returning energy underground, not generating any toxic and harmful materials during operation, and having no public nuisance and pollution and having low cost.

DETAILED DESCRIPTION OF THE PREFERRED EMBODIMENTS

Figure 1:
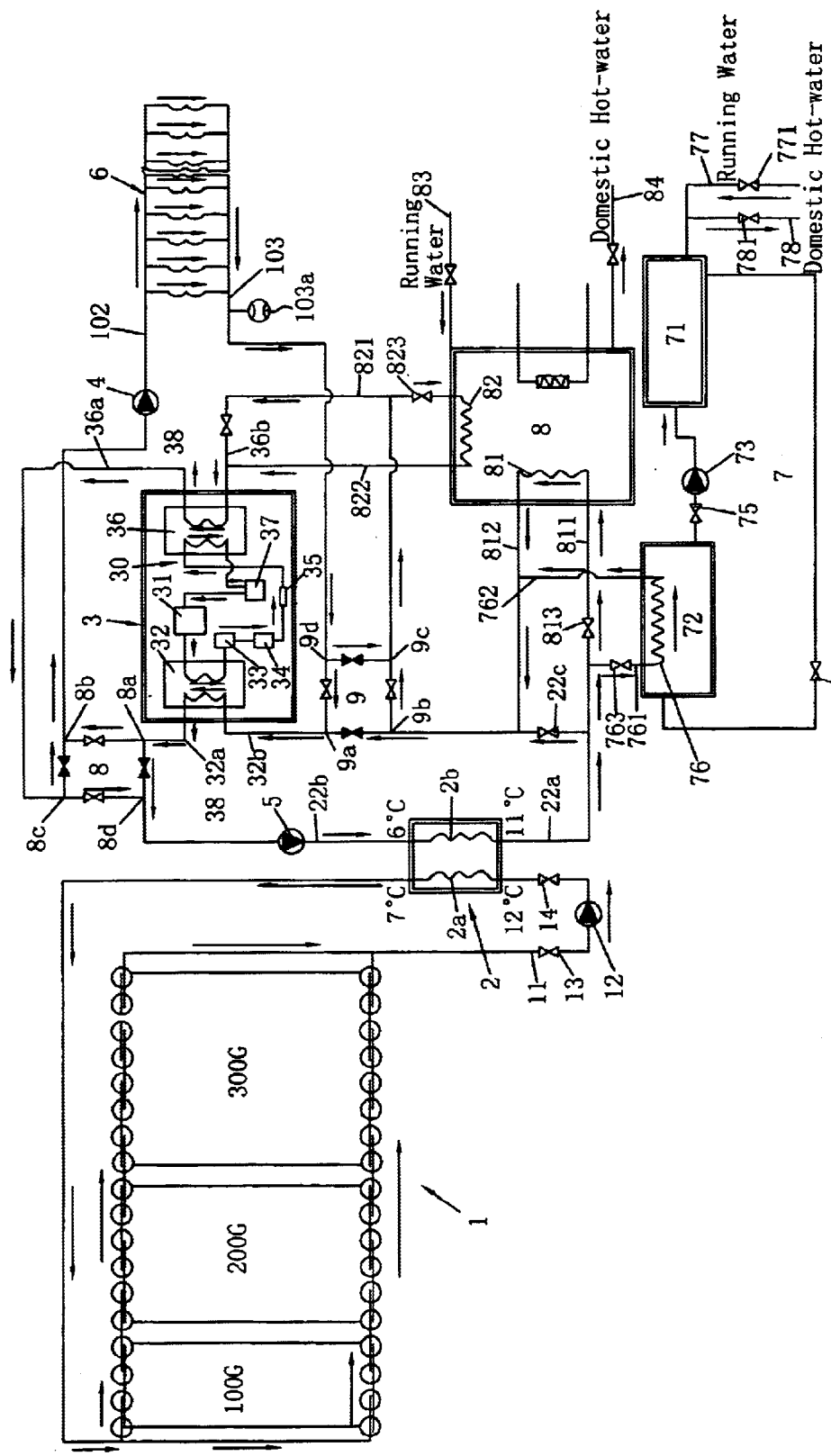
FIG. 1 is a structural schematic of the liquid air conditioner system of geothermal energy type of the present invention.

Incorporating with the accompanied drawings, the preferred embodiments of the liquid air conditioner of geothermal energy type of the present invention shall be explained in detail as follows:

Referring to FIG. 1, FIG. 1 is a structural schematic of the liquid air conditioner system of geothermal energy type of the present invention. The liquid air conditioner of geothermal energy type of the present invention comprises, described in detail hereinafter, a heat collector 1 of geothermal energy type, a heat exchanger 2, an energy lift device 3, a discharging pump 4, a returning pump 5, and an air conditioner 6. A discharging pump 12 of the heat collector is mounted on discharging tube 11 of heat collector 1 of geothermal energy type to accelerate the speed of liquid flow in heat collector 1, and increase the heat exchanging efficiency. A conventional heat exchanger of the plate-type can be utilized for heat exchanger 2, and discharging tube 11 of heat collector 1 is connected to inlet side 2a of heat exchanger 2.

The energy lift device 3 comprises a heating cycle 30 and a heat exchanging cycle 38, in which heating cycle 30 is the same as the heating (refrigerating) cycle employed in the conventional air conditioner and refrigerator. A medium R22 used for heating circulation is filled in heating cycle 30. Said energy lift device 3 comprises a heat exchanging cycle 38 and a heating cycle 30, said two cycles are sequentially connected through pipelines by a compressor 31, a condenser 32, a liquid reservoir 33, a drying filter 34, a restriction choke 35, an evaporator 36 and a gas-liquid separator 37.

A discharging tube 32a of the heat exchanging cycle coupling with condenser 32 in heat exchanging cycle 38 is connected to the first joint 8a of the first two-position-four-way valve 8. A liquid inlet tube 32b of heat exchanging cycle coupling with condenser 32 in heat exchanging cycle 38 is connected to the first joint 9a of the second two-position-four-way valve 9, and a discharging tube 36a of the heat exchanging cycle coupling with evaporator 36 in heat exchanging cycle 38 is connected to the third joint 8c of the first two-position-four-way valve 8. A liquid inlet tube 36b of the heat exchanging cycle coupling with evaporator 36 in heat exchanging cycle 38 is connected to the third joint 9c of the second two-position-four-way valve 9 via connecting pipeline 821 of waste-heat heater 82 to be described hereinafter.

A conventional fan-coil unit may be utilized for air conditioner 6. A liquid inlet tube 102 of air conditioner 6 is connected to the second joint 8b of the first two-position-four-way valve 8 via discharging pump 4. A returning tube 103 of air conditioner 6 is connected with the fourth joint 9d of the second two-position-four-way valve 9. An expansion tank 103a is mounted on returning tube 103 of air conditioner 6, and the function of said expansion tank 103a is to store the increased liquid volume due to the thermal expansion of liquid in heat exchanging cycle 38.

A liquid inlet tube 22b on outlet side 2b of heat exchanger 2 is connected to the fourth joint 8d of the first two-position four-way valve 8 via returning pump 5. A discharging tube 22a on outlet side 2b of heat exchanger 2 is connected to the second joint 9b of the second two-position-four-way valve 9 via a stop valve 22c mounted on said discharging tube 22a.

The object of providing two aforesaid two-position-four-way valves is to enable the liquid air conditioner of geothermal energy type of the present invention to be adapted for usage in winter and summer. If it is solely used for winter heating, then the two-position-four-way valves may not be mounted. At this time, said discharging tube 32a of the heat exchanging cycle coupling with said condenser 32 in heat exchanging cycle 38 can be directly connected to said liquid inlet tube 102 of air conditioner 6 via a discharging pump 4. Said returning tube 103 of air conditioner 6 is connected with said liquid inlet tube 32b of heat exchanging cycle 38 coupling with condenser 32. Said discharging tube 36a of heat exchanging cycle 38 coupling with evaporator 36 is directly connected to said returning tube 22b on outlet side 2b of heat exchanger 2 via a returning pump 5, and said discharging tube 22a on outlet side 2b of heat exchanger 2 is directly connected to said liquid inlet tube 36b of heat exchanging cycle 38 coupling with evaporator 36.

Obviously, each of two-position-four-way valves may be substituted with four-common-stop valves according to the connection model as shown in the figure.

When the weather is cold, and heat supplied by the heat collector of geothermal energy type is insufficient, a solar energy heat collector 7 may be added on the liquid air conditioner of geothermal energy type of the present invention. The solar energy heat collector can provide an auxiliary heat source for heat collector 1 of geothermal energy type, as well as supply domestic hot water for the residents. The solar energy heat collector 7 includes a solar water heater 71, a solar energy reservoir 72, a water circulating pump 73 in serial connection through pipelines. An inlet stop valve 74 and an outlet stop valve 75 are provided on the inlet and outlet pipelines of solar energy reservoir 72 respectively. A heat exchanger 76 is equipped on solar energy reservoir 72. Inlet and outlet pipelines 761, 762 of heat exchanger 76 are connected in parallel on discharging tube 22a at outlet side 2b of heat exchanger 2. An inlet stop valve 763 of the heat exchanger is equipped on the inlet pipeline 761, and said heat exchanger 76 may be in parallel connected on the discharging tube 22a as an auxiliary heat source according to weather condition.

A cold running water inlet tube 77 and a domestic hot-water outlet tube 78 are connected on said solar water heater 71, and a stop valve 771 of running water tube and a stop valve 781 of domestic hot-water discharging tube are provided on above tubes respectively.

In cold regions, when the weather is extremely cold, and the heat supplied by heat collector 1 of geothermal energy type and solar energy heat collector 7 is still insufficient, an electric water heater 8 serving as an auxiliary energy source may be further equipped on the liquid air conditioner of geothermal energy type of the present invention. A transducer 81 is provided in electric water heater 8, and the plate-type heat exchanger's structure can likewise be adapted for the transducer 81, and inlet and outlet pipelines 811, 812 are in parallel connected on the discharging tube 22a at the outlet side of heat exchanger 2. A transducer's inlet stop valve 813 is mounted on inlet pipeline 811 of the transducer 81. As using transducer 81, a stop valve 22c on the discharging tube may be closed. In spring and autumn, when the liquid air conditioner of geothermal energy type stops operating, the electric water heater can heat the domestic hot water. An inlet running water tube 83 and a domestic hot-water discharging tube 84 are provided on electric water heater 8. A waste-heat heater 82 can also be mounted in electric water heater 8. The function of waste-heat heater 82 is to achieve the object of saving electricity and supplying the domestic hot-water in winter and summer, utilizing waste heat of the liquid air conditioner of geothermal energy type of the present invention to heat water in the electric water heater. A stop valve 823 is equipped on pipeline 821 of waste-heat heater 82. When waste-heat heater 82 is not working, stop valve 823 may be shut off.

Figure 3:
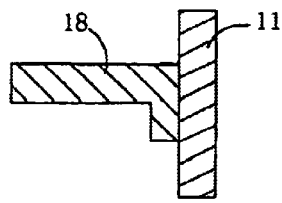
FIG. 3 is a cross sectional diagram of FIG. 2 taken along A—A line.
Figure 4:
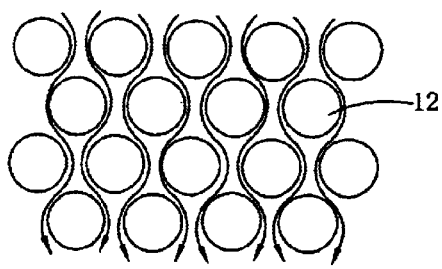
FIG. 4 is a configurationally schematic of the storage cylinder in the storage box in FIG. 2.
Figure 2:
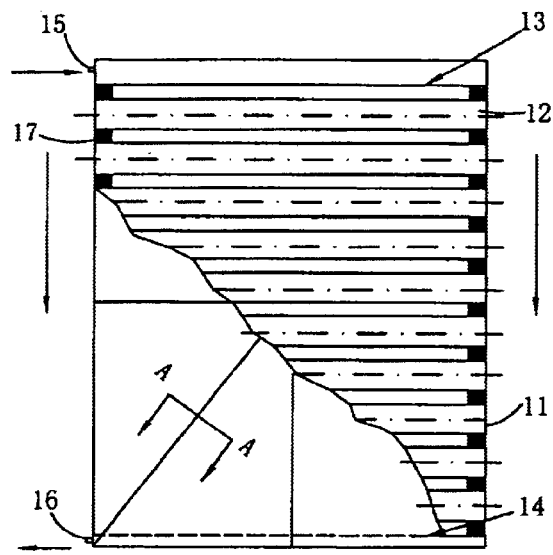
FIG. 2 is a structural schematic of the storage box employed in the liquid air conditioner of geothermal energy type of the present invention.

Referring to FIGS. 2–4, FIGS. 2–4 are schematics showing the structure of storage box employed in the liquid air conditioner of geothermal energy type in the present invention. The storage box, which can be made into cylindrical model, comprises a storage container 11, storage cylinders 12 filled with the phase transition materials, e.g. water, glycerin, salt water or ethanol etc., located in stagger by several layers in the container, a upper flow equalizer 13 having evenly distributed throughholes placed on the top layer of the storage cylinders, and a back plate 14 having evenly distributed throughholes placed beneath the bottom layer of the storage cylinders. A liquid inlet 15 is provided between the upper flow equalizer 13 and the top wall of storage container 11, and a liquid outlet 16 is formed between back plate 14 and the bottom wall of container 11. Several star-shaped "*" radiating fins 18 (see FIG. 3) are provided on the outer wall of storage container 11. Both ends of each storage cylinder have convex shoulders 17 forming gaps for liquid flow between the storage cylinders, wherein storage cylinders 12 can be made of high-intensity anticorrosive plastics. The convex shoulders 17 allow the gaps existing between storage cylinders 12, thereby ensure the liquid flowing around the storage cylinders 12 (see FIG. 4). In flowing process, the liquid transfers energy to the storage cylinders 12 for energy storage. When the liquid requires energy, by means of the liquid flowing around the storage cylinders 12, the energy is transmitted from the storage cylinders 12 to the liquid. Therefore the object of storing and releasing energy of the storage cylinders 12 is achieved.

Why the storage box is inserted under the ground is because at where a thermostatic zone exists, in where temperature changes little. The thermostatic zone is also known as—warm in winter and cool in summer. Besides the flowing liquid exchanges heat with the storage cylinders 12, the storage box under the ground can further exchange heat with the thermostatic zone underground. Cold is transferred to the storage box in summer, and heat is transferred to the storage box in winter.

Another important feature of the storage box is to store energy by means of phase transition. Take water for example, the phase-transition temperature of water is 0° C. In liquid state, 1 m$^3$ of water requires energy of 1 kwh/° C.m$^3$ to increases or decreases the temperature by 1° C. When phase transition occurs, water at 0° C. requires energy of 48.4 kwh/m$^3$ for transforming into ice at 0° C., i.e. as the phase transition of water takes place at 0° C., 1 m$^3$ of water can provide energy of 48.4 kwh/m$^3$.

In winter, the temperature of storage box embedded under the ground shall be approximately coincident with the temperature underground at 10° C. Now lets calculate the energy stored in the storage box. Assume that the volume of flowing liquid in the storage box is 1 m$^3$, the volume of the liquid in the storage cylinders is 2 m$^3$, and the volume of total liquid is 2+1=3 m$^3$. Sensible heat down to 0° C. is 3 m$^3$×1 kwh/° C. m$^3$×10° C.=30 kwh. When the phase transition occurs, the stored energy of the liquid in the storage cylinders is 2 m$^3$×48.4 kwh/m$^3$=96.8 kwh. Total energy stored in the storage box is 30+96.8=126.8 kwh. If the liquid air conditioner requires 10 kw per hour, the time for supplying energy from the storage box is 126.8 kwh/10 kw=12.68 hs, i.e. under the adiabatic condition, the storage box can supply energy 126.8 kwh for the liquid air conditioner.

In summer, underground temperature is 15° C. Out of the door, the radiating temperature from the air conditioner is 50° C. The temperature difference is 50° C.−15° C.=35° C., and the total stored cooling energy is 1 kwh/° C.m$^3$×35° C.×3 m$^3$=105 kwh. The energy consumption per hour is 10 kw, and the time for providing cooling is 105 kwh/10 kw=10.5 hs under adiabatic state. Considering the heat exchange between the underground thermostatic zone and the storage box, the actual value can be far more than the above value.

Since the volume of the storage box of geothermal energy type is room-occupied, it is suitable for application in the building of dispersed residence and in a large space.

Figure 5:
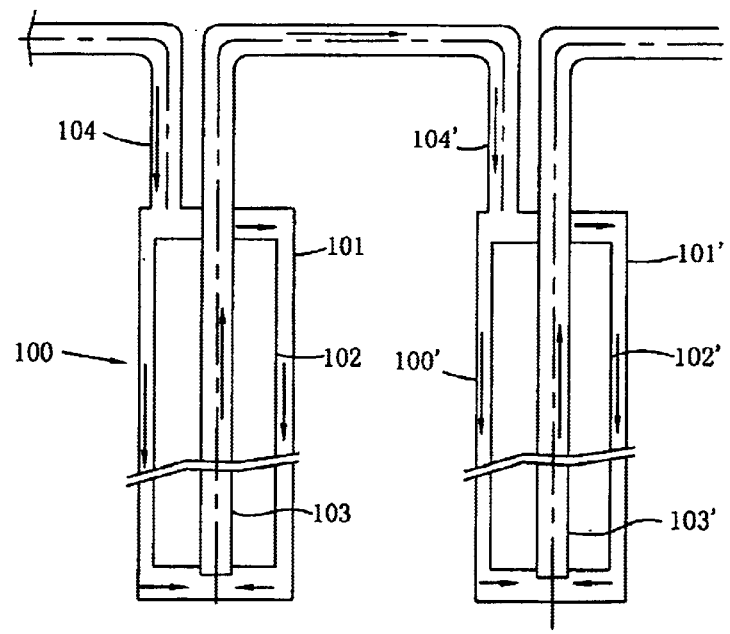
FIG. 5 is a structural schematic of the heat collector tube employed in the liquid air conditioner of geothermal energy type of the present invention.

Referring to FIG. 5. FIG. 5 is a structural schematic of the heat collector tube of geothermal energy type of the present invention. A serial connection between two heat collector tubes: 100 and 100' of geothermal energy type is sketched in the structural schematic. Take heat collector tube 100 for example, the heat collector tube 100 consists of, assembled on a coaxial line, a outer heat exchanging cylinder 101, a storage cylinder 102 situated in the outer heat exchanging cylinder 101, a liquid discharging tube 103 situated in storage cylinder 102, and a liquid inlet tube 104 connected to the top of the outer heat exchanging cylinder 101. The storage cylinder 102 may be soldered in the outer heat exchanging cylinder 101 with several support sheets (not shown in the figure). The discharging tube 103 may be directly soldered onto the top and bottom walls of the storage cylinder. The discharging tube 103 of the heat collector tube 100 is connected to the liquid inlet tube 104' of the heat collector tube 100'. The discharging tube 103' of the heat collector tube 100' can be connected to the liquid inlet tube of the next heat collector tube (not shown in the figure), thus a plurality of heat collector tubes can be connected in series to form a heat collector tube unit.

Figure 6:
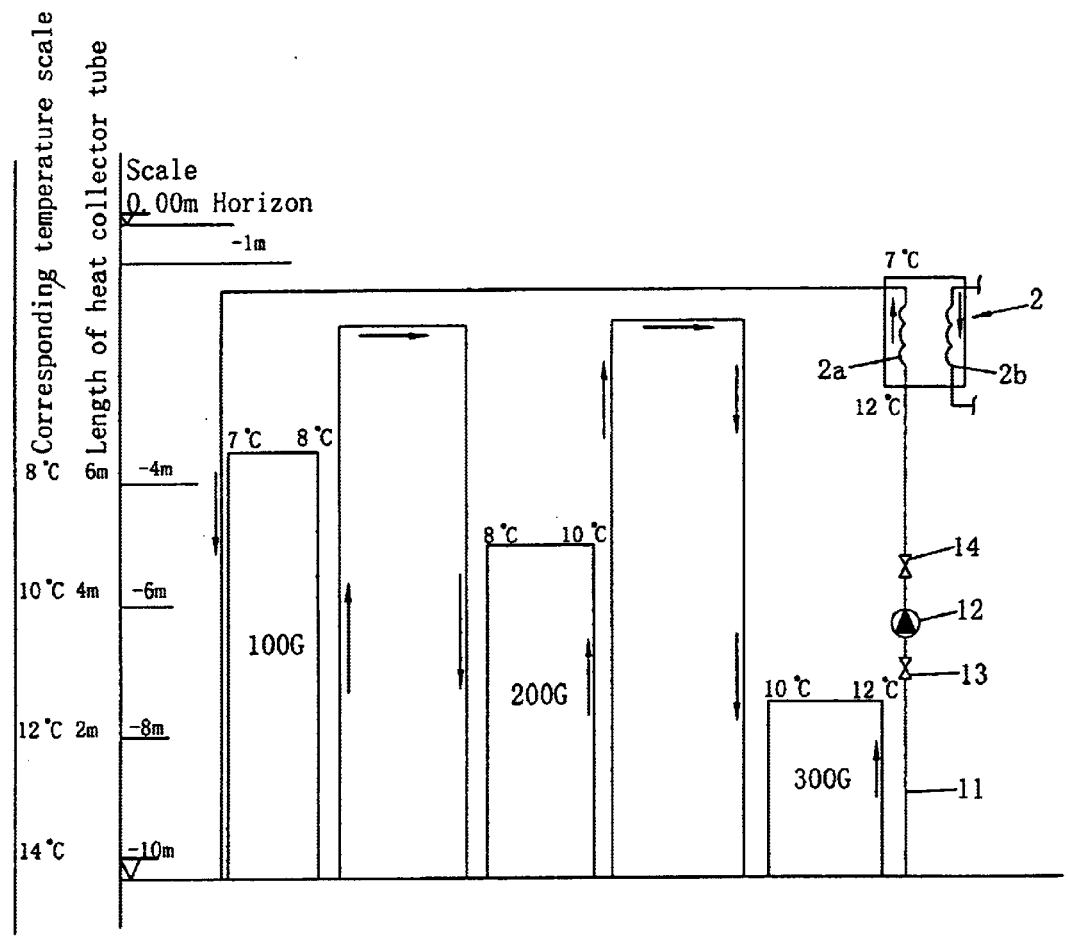
FIG. 6 is a structural schematic of the heat collector of geothermal energy type comprising of three sets of heat collector tube units adopted in the liquid air conditioner of geothermal energy type of the present invention.

Referring to FIG. 6, FIG. 6 is a structural schematic of the heat collector tube of geothermal energy type composed of three heat collector tube units connected in series used in the liquid air conditioner of geothermal energy type of the present invention. Assume that the first heat collector tube unit 100G consists of 8 heat collector tubes (see FIG. 1), and the length of each heat collector tube is 6 m. And assume that the second heat collector tube unit 200G of geothermal energy type consists of 12 heat collector tubes (see FIG. 1), the length of each heat collector tube is 4 m. Then assume that the third heat collector tube unit 300G consists of 16 heat collector tubes (see FIG. 1), and the length of each heat collector tube is 2 m. The discharging tube of the last set of heat collector tube unit is connected to the main discharging tube 11 of the heat collector tube. On the pipeline of the discharging tube 11, the stop valve 13 and the stop valve 14 are mounted on the inlet and outlet of the discharging pump 12 respectively, in order for replacing discharging pump 12 in repair. The heat collector tube unit 100G, 200G or 300G is all vertically embedded underground to the depth of 10 m, in order for absorbing heat from underground stage by stage from low to high, to reach the required temperature finally. For example, water at 7° C. can be heated up to 8° C. via the first heat collector tube unit 100G, the temperature of water is raised to 10° C. via the second heat collector tube unit 200G, and the temperature of water is raised to 12° C. via the third heat collector tube unit 300G. After the water at 12° C. transfers the heat via heat exchanger to outlet side 2b of the heat exchanger, the water cools to 7° C. and returns to the first heat collector unit 100G, then the water heats up via the second, third heat collector unit, in doing so, the process revolves endless. For example, the outer diameter of outer heat exchanging cylinder 101 of the heat collector tube is selected as 100 mm. The outer diameter of storage cylinder 102 is selected as 80 mm. The outer diameter of discharging tube is selected as 25 mm. The variation relation between the temperature underground and the depth is given at left side in FIG. 6. The advantage of the heat collector tube of geothermal energy type is that it occupies less room in order to place under the ground of buildings where have crowded using space.

The liquid air conditioner of geothermal energy type of the present invention, wherein, the antifreeze solution can be used for working medium in its heat exchanging cycle and heat collector.

Incorporating with the drawings, the working process of the liquid air conditioner of geothermal energy type of the present invention shall be described. Referring to FIG. 1, the black portions in the first two-position-four-way valve 8 and the second two-position-four-way valve 9 in FIG. 1 represent the closed passageways, and the blank portions are the opened passageways. In winter, as described above, the temperature of water in the heat collector of geothermal energy type is raised to 12° C. by the heat collector, and the water at 12° C. is sent to the inlet side 2a of the heat exchanger 2 by the discharging pump 12 via the valves 13, 14, and the heat energy is transferred to the outlet side 2b of the heat exchanger through the heat exchanger 2. The water at 11° C. in the outlet side 2b is sent to the heat exchanging cycle 38 coupling with the evaporator 36 via the stop valve 22c, the second two-position-four-way valve 9, and the pipelines 821, 36b. The heat exchange is carried out in the evaporator 36 so as to transfer the heat energy to the evaporator 36. The liquid after the heat exchange returns to the heat exchanger 2 via the discharging tube 36a, the first two-position-four-way valve 8, the returning pump 5 and the returning tube 22b of the heat exchanger 2. Meanwhile, the working medium R22 in the evaporator 36 is transformed into gas at low temperature and low pressures, and sent into the separator 37 by the function of the evaporator 36, then sent to the compressor 31 after the gas-liquid separation in the gas-liquid separator 37. The gas at low temperature and low pressure is transformed into the gas at high temperature and high pressure by the compressor and sent to the condenser 32. In the condenser 32, the gas at high temperature and high pressure sent out by compressor 31 transmits heat energy to the working medium in the heat exchanging cycle 38 coupling with the condenser 32. After heat exchanging, the heated liquid working medium flows into the air conditioner through the discharging tube 32a, the first two-position-four-way valve 8, the discharging pump 4 and the liquid inlet tube 10 of the air conditioner 6 to raise the temperature of room air. The liquid working medium after heat radiation in the air conditioner, returns to the heat exchanging cycle 38 coupling with the condenser 32 through the returning tube 103 of the air conditioner, the second two-position-four-way valve 9, and the liquid inlet tube 32b to complete the working cycle.

In summer cooling, the directions of the first two-position-four-way valve 8 and the second two-position-four-way valve 9 in the figure should be changed over, i.e. the black passageways of the first, second two-position-four-way valve should be changed with the blank passageways, and as well the on, off portion is just reversed each other in the figure. The first two-position four-way valve 8 is connected to the discharging tube 36a of the heat exchanging cycle 38 coupling with the evaporator 36 and the returning tube 102 of the air conditioner 6, and also connected to the discharging tube 32a of the heat exchanging cycle 38 coupling with the evaporator 32 and the returning tube 22b of the heat exchanger 2, meanwhile the second two-position-four-way valve 9 is connected to the liquid inlet tube 36b of the heat exchanging cycle 38 coupling with evaporator 36 and returning tube 103 of air conditioner 6, and also connected to liquid inlet tube 32b of heat exchanging cycle 38 coupling with the condenser 32 and the discharging tube 22a of the heat exchanger 2, so that the working medium at low temperature in the heat exchanging cycle 38 coupling with the evaporator 36 connects to the air conditioner, thereby providing cool air to the room is realized.

The liquid air conditioner of geothermal energy type of the present invention generally employs intermittent work in operation. For example, it works for one hour while stops for 2 hours, or works for half an hour while stops for one hour, so that enough energy may be stored in the heat collector.

INDUSTRIAL APPLICATION

The liquid air conditioner of geothermal energy type of the present invention, collects and stores the massive low level cold and heat source containing under the ground, and transfers the low level cold and heat energy of the heat collector of geothermal energy type to the energy lift device, then the lifted high level cold and heat energy is transmitted to the place where requires cold and, heat. For this invention, none of any toxic and harmful materials, public nuisance and pollution, is generated during operation, and the air conditioner costs lower. It can be used for room heating or cooling, and for supplying domestic water.

What is claimed is:

1. A liquid air conditioner of the geothermal energy type, comprising:

a heat collector of the geothermal energy type under the ground, a heat exchanger, an energy lift device, a discharging pump, a returning pump, an air conditioner, a heat collector discharging pump equipped on a discharging tube of said heat collector, said discharging cube being connected to an inlet side of said heat exchanger;

said energy lift device comprises a heating cycle and a heat exchanging cycle, said two cycles are sequentially connected through pipelines by a compressor, a condenser, a liquid reservoir, a drying filter, a restriction choke, an evaporator and a gas liquid separator;

a discharging tube of the heat exchanging cycle coupling with the condenser in the heat exchanging cycle being connected with the air conditioner via a liquid inlet tube of the air conditioner and a discharging pump;

a returning tube of the air conditioner being connected to a liquid inlet tube of the heat exchanging cycle coupling with said condenser;

a discharging tube of the heat exchanging cycle coupling with said evaporator being connected to a returning tube on an outlet side of the heat exchanger via the returning pump; and a discharging tube on the outlet side of the heat exchanger being connected to a liquid inlet tube of the heat exchanging cycle coupling with the evaporator.

2. The liquid air conditioner of the geothermal energy type according to claim 1, further including two two-position-four-way valves, the discharging tube of the heat exchanging cycle coupling with the condenser being connected to a first joint of the first two-position-four-way valve, the liquid inlet tube of the heat exchanging cycle coupling with the condenser being connected to a first joint of the second two-position-four-way valve, the liquid inlet tube of the air conditioner being connected to a second joint of the first two-position-four-way valve, the returning tube of the air conditioner being connected to a fourth joint of the second two-position-four-way valve, the discharging tube of the heat exchanging cycle coupling with the evaporator being connected to a third joint of the first two-position-four-way valve, the liquid inlet tube of the heat exchanging cycle coupling with the evaporator being connected to a third joint of the second two-position-four-way valve, the liquid inlet tube on the outlet side of the heat exchanger being connected to a fourth joint of the first two-position-four-way valve, the discharging tube on the outlet side of the heat exchanger being connected to a second joint of the second two-position-four-way valve.

3. The liquid air conditioner of the geothermal energy type according to claim 2, further including a solar energy heat collector, said solar energy heat collector comprising a circulation loop consisting of a solar water heater, a solar energy reservoir, a water circulating pump sequentially connected via pipelines in series, an inlet stop valve and an outlet stop valve being provided on inlet, outlet pipelines of said solar energy reservoir, a heat exchanger being mounted in said solar energy reservoir, the inlet and outlet pipelines of said heat exchanger being in parallel connected to the discharging tube at the outlet side of the heat exchanger, and the inlet stop valve of the heat exchanger being mounted on the inlet pipeline.

4. The liquid air conditioner of the geothermal energy type according to claim 3, wherein a running water inlet tube and a domestic hot-water discharging tube are connected onto said solar water heater, a stop valve of the running water tube and a stop valve of the domestic hot-water discharging tube being mounted respectively onto said running water inlet tube and the domestic hot-water discharging tube.

5. The liquid air conditioner of the geothermal energy type according to claim 4, further comprising an electric water heater, a transducer being mounted in said electric water heater, inlet and outlet pipelines of said transducer being connected in parallel on the discharging tube at the outlet side of said heat exchanger, the inlet stop valve of the transducer being equipped on the inlet pipeline of said transducer.

6. The liquid air conditioner of the geothermal energy type according to claim 5, wherein a waste-heat heater is mounted in said electric water heater, inlet and outlet pipelines of said waste-heat heater being connected in parallel onto said liquid inlet tube of the heat exchanging cycle coupling with said evaporator, a stop valve of waste-heat heater being mounted on the inlet or outlet pipeline of said waste-heat heater.

7. The liquid air conditioner of the geothermal energy type according to claim 1, wherein said heat collector of the geothermal energy type is a storage box, said storage box comprising a storage container, storage cylinders filled with phase-transition materials, staggered in several layers in storage container, an upper flow equalizer evenly distributed with throughholes placed on a top layer of said storage cylinders and a back plate evenly distributed with throughholes placed beneath a bottom layer of said storage cylinders, a liquid inlet being provided between said upper flow equalizer and a top wall of said storage container, a liquid outlet being provided between the back plate and a bottom wall of said storage container, both ends of each of the storage cylinders having convex shoulders forming the fluid-flowing gaps between the storage cylinders, several fins being mounted on an outer wall of said storage container.

8. The liquid air conditioner of the geothermal energy type according to claim 7, wherein said fins are in star-shaped disposition.

9. The liquid air conditioner of the geothermal energy type according to claim 1, wherein said heat collector of the geothermal energy type is a heat collector system consisting of several heat collector tube units in series connection, each said heat collector tube unit consisting of several heat collector tubes in serial connection, each heat collector tube consisting of, coaxially connected, an outer heat exchanging cylinder, a storage cylinder located in said outer heat exchanging cylinder, a discharging tube located in said storage cylinder and a liquid inlet tube on the top of said outer heat exchanging cylinder.

10. The liquid air conditioner of the geothermal energy type according to claim 9, wherein said heat collector system of the geothermal energy type consists of three stages of heat collector tube units, in which a length of the outer heat exchanging cylinder of a first heat collector tube unit is 6 m, a length of the outer heat exchanging cylinder of a second heat collector tube unit is 4 m, and a length of the outer heat exchanging cylinder of a third heat collector unit is 2 m.

11. The liquid air conditioner of the geothermal energy type according to claim 10, wherein an outer diameter of the outer heat exchanging cylinder is 100 mm, an outer diameter of the storage cylinder is 80 mm, and an outer diameter of the discharging tube is 25 mm.

12. The liquid air conditioner of the geothermal energy type according to claim 8, wherein an antifreeze solution is filled in said heat exchanging cycle.

13. The liquid air conditioner of the geothermal energy type according to claim 11, wherein an antifreeze solution is filled in said heat exchanging cycle.

* * * * *